United States Patent [19]

Fujiki et al.

[11] Patent Number: 5,360,858

[45] Date of Patent: Nov. 1, 1994

[54] SILICONE RUBBER ADHESIVE COMPOSITIONS

[75] Inventors: Hironao Fujiki; Kaoru Michimata, both of Takasaki, Japan; Atsushi Yaginuma, Torrance, Calif.; Nobuyuki Hasebe; Clara Y. Kim, both of La Mirada, Calif.

[73] Assignees: Shin-Etsu Chemical Co., Ltd., Tokyo, Japan; Shin-Etsu Technical Services, Inc., Torrance, Calif.

[21] Appl. No.: 158,366

[22] Filed: Nov. 29, 1993

Related U.S. Application Data

[63] Continuation of Ser. No. 822,654, Jan. 21, 1992, abandoned.

[51] Int. Cl.$^5$ .................. C08G 77/08; C08K 3/10
[52] U.S. Cl. .................. 524/434; 528/15; 528/31; 528/32; 524/731; 524/784; 524/862; 524/588; 525/478
[58] Field of Search .................. 528/15, 31, 32; 524/731, 784, 862, 434, 588; 525/478

[56] References Cited

U.S. PATENT DOCUMENTS

| | | | |
|---|---|---|---|
| 3,532,649 | 10/1970 | Smith | 260/18 |
| 4,332,844 | 6/1982 | Hamada et al. | 427/387 |
| 4,677,161 | 6/1987 | Suzuki et al. | 524/862 |
| 4,680,364 | 7/1987 | Lucas | 528/15 |
| 4,742,103 | 5/1988 | Morita et al. | 524/174 |
| 5,006,580 | 4/1991 | Kasuya et al. | 524/264 |
| 5,096,990 | 3/1992 | Takayanagi et al. | 528/15 |

*Primary Examiner*—Melvyn I. Marquis
*Assistant Examiner*—Margaret W. Glass
*Attorney, Agent, or Firm*—Birch, Stewart, Kolasch & Birch

[57] ABSTRACT

To a silicone rubber adhesive composition comprising (A) a diorganopolysiloxane containing at least two alkenyl groups in a molecule, (B) a diorganohydrogenpolysiloxane having at least two hydrogen atoms directly attached to silicon atoms in a molecule and a viscosity of about 5 to about 5,000 cs at 25°C., (C) an adhesion modifier compound containing in its molecule a group represented by $(RO)_3Si-$ or $H(RO)_2Si-$ wherein R is selected from the group consisting of methyl, ethyl, trifluoroethyl, hexafluoropropyl, and methoxyethyl groups, and (D) a platinum catalyst is added (E) an organic tin compound. The combined use of components (C) and (E) provides he synergistic effect that the resulting adhesive composition can firmly adhere to even polycarbonate and polyphenylene sulfide resins which are known as difficultly bondable resins.

14 Claims, No Drawings

SILICONE RUBBER ADHESIVE COMPOSITIONS

This application is a continuation, of application Ser. No. 07/822,654 filed on Jan. 21, 1992, now abandoned.

This invention relates to a silicone rubber adhesive composition having improved adhesion to plastics and metals. More particularly, it relates to a silicone rubber adhesive composition which can be quickly cured at relatively low temperatures and firmly adhere to engineering plastics such as polycarbonate, PBT and PPS.

BACKGROUND OF THE INVENTION

As is well known in the art, silicone rubber adhesive compositions are generally classified into the addition and condensation curing types. Compositions of the condensation curing type are known to cure at room temperature and firmly adhere to various plastic members, but take a long time to complete curing and are thus unsuitable for the manufacture of electronic parts requiring efficient mass production. Compositions of the addition curing type are suited for the manufacture of such parts because of high curing rate, but are less adhesive to plastics. For curing, they require heating to 100° C. or higher temperature with the risk of heat distortion of plastics.

Many attempts have been made to improve the adhesion of silicone rubber adhesive compositions of the addition curing type. For example, Japanese Patent Publication (JP-B) No. 13508/1978 discloses compounds having a hydrogen atom directly attached to a silicon atom and an oxirane group in their molecule, JP-B 21026/1978, 23354/1970 and 46783/1988 disclose compounds having a trialkoxy group, and JP-B 26376/1983 discloses compounds having a trialkoxy group, an oxirane group and a hydrogen atom directly attached to a silicon atom in their molecule, all teaching that these compounds are effective for improving adhesion. However, adhesive compositions having these compounds blended therein were unsuccessful in achieving sufficient bonding force at low temperatures. Moreover, JP-B 8854/1977 discloses alkoxysilane compounds having an amino group as effective for adhesion improvement. Regretfully, when these compounds are blended in silicone rubber compositions of the addition reaction type, the compositions are less shelf stable either in two- or one-part form because of the presence of amino group.

SUMMARY OF THE INVENTION

Therefore, an object of the present invention is to provide a novel and improved silicone rubber adhesive composition which can firmly adhere to plastics and metals at relatively low temperatures and is shelf stable.

According to the present invention, there is provided a silicone rubber adhesive composition comprising (A) 100 parts by weight of a diorganopolysiloxane containing at least two alkenyl groups in its molecule, (B) a diorganohydrogenpolysiloxane having at least two hydrogen atoms directly attached to silicon atoms in its molecule and a viscosity of about 5 to about 5,000 centistokes at 25° C., in an amount of silicon bonded hydrogen atom are about 0.4 to about 4.0 equivalents per alkenyl group in component (A), (C) about 0.1 to about 20 parts by weight of a compound containing in its molecule a group represented by $(RO)_3Si-$ or $H(RO)_2Si-$ wherein R is selected from the group consisting of methyl, ethyl, trifluoroethyl, hexafluoropropyl, and methoxyethyl groups, (D) a catalytic amount of a platinum catalyst, and (E) about 0.001 to about 1 part by weight of an organic tin compound.

This silicone rubber adhesive composition can firmly adhere to plastics and metals at relatively low temperatures of about 60° C. to 80° C. and is shelf stable. More particularly, adhesive compositions comprising components (A) to (D), but exclusive of component (E) or organic tin compound do not firmly adhere to polycarbonate and polyphenylene sulfide resins which are known to be difficult to bond. Although component (E) or organic tin compound itself has no adhesive action, quite unexpectedly, the combined use of component (E) and component (C) invites a synergistic effect of rendering the compositions well adhesive to such difficultly bondable resins.

DETAILED DESCRIPTION OF THE INVENTION

Component (A) constituting the silicone rubber adhesive composition of the invention is a diorganopolysiloxane containing at least two alkenyl groups in a molecule, preferably represented by the following general formula (1).

$$R^1_a SiO_{(4-a)/2} \qquad (1)$$

In formula (1), $R^1$ is independently selected from substituted or unsubstituted monovalent hydrocarbon groups having 1 to 8 carbon atoms, preferably 1 to 6 carbon atoms, for example, alkyl groups such as methyl, ethyl and propyl; alkenyl groups such as vinyl, propenyl and butenyl; aryl groups such as phenyl and xylyl; and halogenated hydrocarbon groups such as 3,3,3-trifluoropropyl, provided that on average two or more alkenyl groups are contained per molecule. Letter a is a number in the range of from 1.9 to 2.4. The diorganopolysiloxanes may be either linear ones or branched ones containing a $R^1SiO_{3/2}$ or $SiO_{4/2}$ unit. The substituent on a silicon atom may be any of the above-mentioned groups in principle although vinyl is a preferred unsaturated group and methyl is another preferred substituent. A trifluoropropyl group is desirable where solvent resistance is required. The diorganopolysiloxanes may be prepared by well-known conventional techniques, for example, by effecting equilibration reaction between an organocyclopolysiloxane and $(R_3SiO)_2-$ in the presence of an alkali or acid catalyst.

Several illustrative, non-limiting examples of component (A), diorganopolysiloxane are given below.

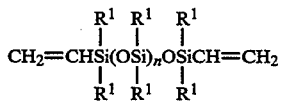

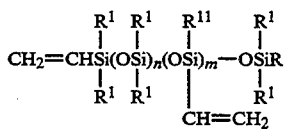

-continued

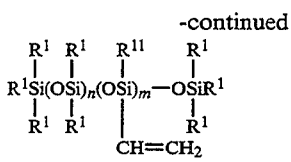

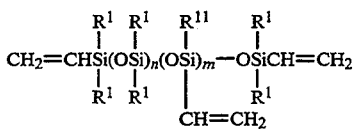

In the formulae, $R^{11}$ is as defined for $R^1$ exclusive of an alkenyl group, and m and n are 10 to 2,000.

Component (B) is a diorganohydrogenpolysiloxane which reacts with component (A) and functions as a cross-linking agent. The diorganohydrogenpolysiloxane should have at least two hydrogen atoms directly attached to silicon atoms in a molecule and a viscosity of about 5 to about 5,000 centistokes at 25° C. No other limit is imposed on the molecular structure of component (B). Conventional well-known diorganohydrogenpolysiloxanes of linear, cyclic or branched structure may be used. Preferred are diorganohydrogenpolysiloxanes of the following general formula (2):

$$H_b R^2{}_c SiO_{(4-b-3)/2} \quad (2)$$

wherein $R^2$ is independently selected from substituted or unsubstituted hydrocarbon groups free of an aliphatic unsaturated bond having 1 to 8 carbon atoms, preferably 1 to 6 carbon atoms, with exemplary groups being as previously listed for $R^1$, letter b is from 0.005 to 1.2, c is from 0.7 to 2.395, and b+c is from 1.9 to 2.4.

Several illustrative, non-limiting examples of component (B) are given below.

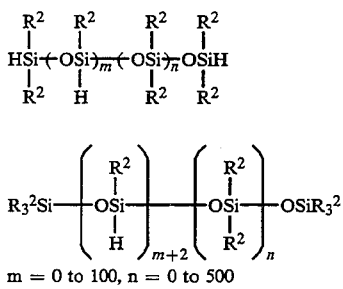

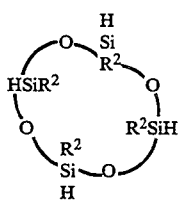

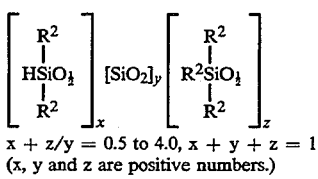

$x + z/y = 0.5$ to $4.0$, $x + y + z = 1$
(x, y and z are positive numbers.)

Component (B) is used in an amount such that its silicon bonded hydrogen atom ranges from about 0.4 to about 4.0 equivalents, preferably from about 0.8 to about 2.0 equivalent per alkenyl group in component (A). With less than 0.4 equivalents, the crosslinking density is low and the cured silicone rubber has poor heat resistance. More than 4.0 equivalents would cause bubbling due to dehydrogenation reaction and adversely affect heat resistance.

Component (B) can also be prepared by well-known methods. For example, it is conventionally prepared with ease by effecting equilibration between octamethylcyclotetrasiloxane and/or tetramethylcyclotetrasiloxane and a compound containing a $(CH_3)_3SiO_{\frac{1}{2}}$ or $H(CH_3)_2SiO_{\frac{1}{2}}$ unit forming a terminal group in the presence of a catalyst such as sulfuric acid, trifluoromethanesulfonic acid, and methanesulfonic acid at a temperature of about $-10°$ C. to about $+40°$ C.

Component (C) which essentially imparts adhesion to the adhesive composition of the invention is a compound containing in its molecule a group represented by $(RO)_3Si-$ or $H(RO)_2Si-$ wherein R is selected from the group consisting of methyl, ethyl, trifluoroethyl, hexafluoropropyl, and methoxyethyl groups.

Preferably, component (C) is selected from the compounds of formulae (I) to (VII):

(I) $(R^3O)_4Si$, (II) $(R^3O)_3SiH$, (III) a partial hydrolysate of the compound of formula (I) or (II),

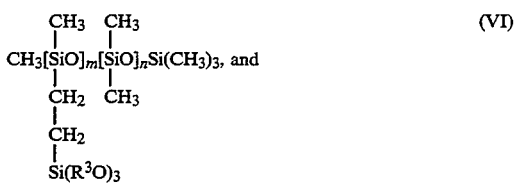

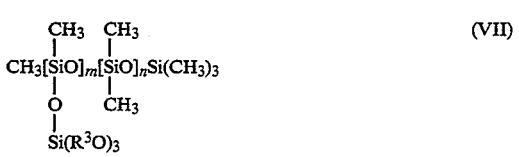

wherein $R^3$ is selected from the group consisting of methyl, ethyl, trifluoroethyl, tetrafluoropropyl, and methoxyethyl groups, $R^4$, $R^5$, and $R^6$ are independently a hydrogen atom or a substituted or unsubstituted monovalent hydrocarbon group having 1 to 8 carbon atoms, $R^7$ is a substituted or unsubstituted monovalent hydrocarbon group having 1 to 30 carbon atoms, —X, or —Q—X, Q is a substituted or unsubstituted divalent hydrocarbon group having 1 to 8 carbon atoms, X is selected from the group consisting of $OR^8$, $NR^9R^{10}$, $SiR^8R^9R^{10}$, and a siloxane polymer having the following formula:

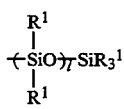

wherein $R^1$ is defined above and l is an integer of 0 to 50, or 0 to 6, $R^8$, $R^9$, and $R^{10}$ are independently a hydrogen atom or a substituted or unsubstituted monovalent hydrocarbon group having 1 to 8 carbon atoms, and letter m is a number of from 1 to 100 and n is a number of from 0 to 500.

Preferred among these are the compounds of formulae (IV), (V) and (VII) because they are more effective in enhancing adhesion at low temperatures.

Also the compounds of formulae (I) to (VII) can be prepared by conventional well-known methods. In particular, the synthesis of the compounds of formulae (IV), (V), and (VII) is briefly described. The compounds of formula (IV) may be prepared by dehydrochlorination between an acetate ester and hydrotrimethoxysilane, for example, in the presence of a zinc compound in accordance with Reformatsky reaction and more easily by alpha-addition through hydrosilylation between an acrylate ester and hydrotrimethoxysilane in the presence of a platinum catalyst. Also, the compounds of formula (V) may be readily prepared by 1,4-addition through hydrosilylation between an acrylate or methacrylate ester and hydrotrimethoxysilane in the presence of a Wilkinson complex catalyst. The compounds of formula (VII) may be prepared by hydrolyzing a corresponding hydrogenpolysiloxane to convert the hydrogen into a silanol group, and effecting dealcoholysis condensation between the silanol group and tetramethoxysilane or hydrotrimethoxysilane in the presence of a basic catalyst such as calcium hydroxide.

Several illustrative, non-limiting examples of component (C) are given below.

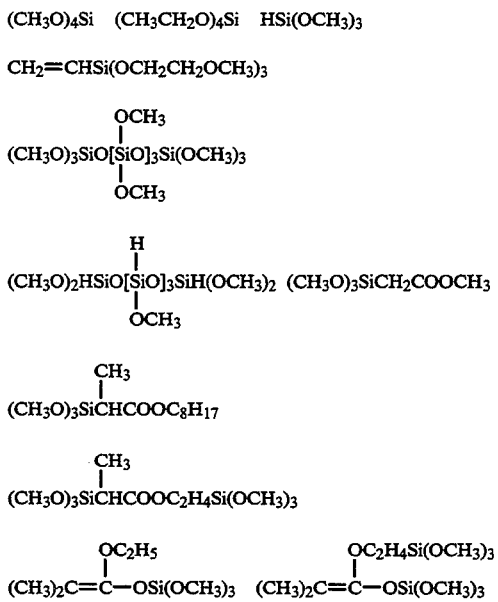

-continued

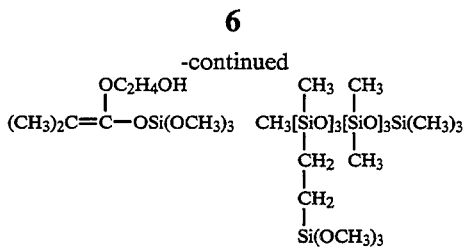

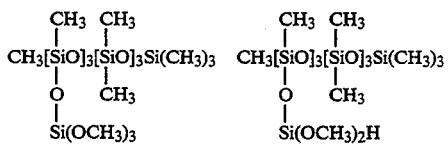

Component (C) is added in an amount of about 0.1 to about 20 parts by weight, preferably about 0.1 to about 0.5 parts by weight per 100 parts by weight of component (A). Less than 0.1 part by weight of component (C) is ineffective for imparting adhesion whereas more than 20 parts by weight of component (C) would give an inferior physical strength of the cured silicone rubber adhesive.

Component (D) is a platinum catalyst which is selected from platinum group metals and compounds thereof. The catalyst may be a conventional well-known catalyst which can promote the addition reaction or hydrosilylation between components (A) and (B). Examples include platinum black, chloroplatinic acid, alcohol modified chloroplatinic acid, complexes of chloroplatinic acid with olefins, aldehydes, vinylsiloxanes, and acetylene alcohols. The amount of the catalyst added may vary in accordance with the desired curing rate although it generally ranges from about 0.1 to about 1,000 parts, preferably from about 1 to about 200 parts by weight of Pt per million parts by weight of component (A).

Component (E) is an organic tin compound. A choice may be made of from organic tin compounds often used in condensation type RTV silicone rubber compositions, for example, dibutyltin dilaurate, dibutyltin dibenzylmaleate, dibutyltin dioctoate, tin dioctylate, di-n-butyldimethoxytin, bisethylmaleyl dibutyltin oxide, dibutyltin benzylmaleate, tetrabutylbis(ethylmaleate)ditin oxide, dibutyltin bis(isooctylphthalate), dibutyltin bis(3-methyl -3-methoxy-butylmaleate), dioctyltin bis(-benzylmaleate), and dioctyltin dilaurate. Among these organic tin compounds recommended are divalent organic tin compounds such as tin dioctylate because they can suppress cleavage degradation of organopolysiloxane in the presence of water.

Component (E) is used in an amount of about 0.001 to about 1 part by weight, preferably about 0.001 to about 0.1 parts by weight per 100 parts by weight of component (A). On this basis, less than 0.001 part by weight of component (E) is ineffective for adhesion improvement whereas more than 1 part by weight of component (E) slows down the curing rate because the organic tin compound in nature has curing inhibiting effect to addition curing type silicone rubber compositions as taught by U.S. Pat. No. 3,532,649.

If desired, the adhesive composition of the present invention may contain any other additives insofar as the benefits of the invention are maintained. For example, fumed silica, precipitated silica, those silicas modified to be hydrophobic, carbon black or the like is added as a reinforcing filler, anti-settling agent or electrical conductive agent. Quartz powder, fused quartz, spherical silica, diatomaceous earth, zeolite, calcium carbonate, titanium dioxide, iron oxide, aluminum oxide, spherical alumina, aluminum hydroxide, aluminum nitride, magnesium sulfate or the like is added as a semi-reinforcing filler, extender, or heat conductive filler. Lead and lead compound such as lead hydroxide are used for radiation shielding purposes. Further, mechanical strength may be enhanced by blending a silicone resin which consists essentially of $SiO_2$ and $R_3SiO_{\frac{1}{2}}$ units, contains at least one alkenyl group in a molecule, and is soluble in silicone fluids.

If it is desired to control the curing time on use of the adhesive composition of the invention, a curing control agent may be used. Examples of the curing control agent include vinyl-containing organopolysiloxanes such as vinylcyclotetrasiloxane, triallyl isocyanate, alkyl maleates, acetylene alcohols and silane- and siloxane-modified products thereof, hydroperoxides, tetramethylethylenediamine, benzotriazole and mixtures thereof.

The adhesive composition of the invention is applied to various members to be bonded, typically of plastics and metals. Bonding may use any desired well-known techniques. Typically, the adhesive composition is applied to a member and then cured. The preferred curing conditions include a temperature of from about 60° C. to about 120° C., especially from about 80° to about 100° C. and a time of from about 60 to about 180 minutes, especially from about 60 to about 120 minutes.

The adhesive composition of the invention is adhesive to such plastics as polybutylene terephthalate resins, polyphenylene sulfide resins, ABS resins, polycarbonate resins, polyphenylene oxide resins, polyester resins, phenolic resins, epoxy resins, and vinyl chloride resins as well as metals such as aluminum, steel and nickel. The composition finds frequent application in bonding of the polycarbonate resins and polyphenylene sulfide resins because the composition can firmly adhere to these difficultly bondable resins.

EXAMPLE

Examples of the present invention are given below by way of illustration and not by way of limitation.

Example

An adhesive composition was prepared by adding to 100 grams of a diorganopolysiloxane blocked with a dimethylvinylsilyl group at either end and having a viscosity of 1000 cs at 25° C., 0.5 grams of a toluene solution containing 1% by weight of a chloroplatinic acid-1,3-divinyl-1,1,3,3-tetramethyldisiloxane complex calculated as elemental platinum and 0.4 grams of 1,3,5,7-tetramethyl-1,3,5,7-tetravinylcyclotetrasiloxane as a curing time control agent and agitating them until a homogeneous mixture was obtained. To the mixture was added 2.5 grams of an organohydrogenpolysiloxane having the average structural formula:

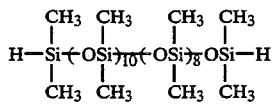

having a viscosity of 10 cs at 25° C., followed by thorough stirring. To the resulting mixture, designated mixture M, an organic tin compound and an adhesion modifier were added as shown in Table 1 and the contents were agitated until a homogeneous mixture was obtained.

The resulting adhesive compositions were applied to various substrates shown in Table 2 and cured by heating at 80° C. for 2 hours. The adhesion of the cured silicone rubber to the substrate was examined by rubbing the bond interface with a spatula and evaluated "O" when the rubber firmly bonded to the substrate and "X" when the rubber did not bond to the substrate.

TABLE 1

| Example | Mixture M (g) | Organic tin compound | (g) | Adhesion modifier | (g) |
|---|---|---|---|---|---|
| 1 | 102.6 | tin dioctylate | 0.05 | E | 1.0 |
| 2 | 102.6 | dimethoxydi-n-butyltin | 0.05 | E | 1.0 |
| 3 | 102.6 | dibutyltin dioctoate | 0.05 | E | 1.0 |
| 4 | 102.6 | tin dioctylate | 0.05 | A | 0.5 |
| 5 | 102.6 | tin dioctylate | 0.05 | B | 0.6 |
| 6 | 102.6 | tin dioctylate | 0.05 | C | 0.8 |
| 7 | 102.6 | tin dioctylate | 0.05 | D | 0.5 |
| 8 | 102.6 | tin dioctylate | 0.05 | F | 0.6 |
| 9 | 102.6 | tin dioctylate | 0.05 | G | 0.8 |
| 10 | 102.6 | tin dioctylate | 0.5 | E | 1.0 |
| Comparative Example 1 | 102.6 | tin dioctylate | 0.05 | | |
| Comparative Example 2 | 102.6 | | | E | 1.0 |

$(CH_3O)_4Si$ (A)

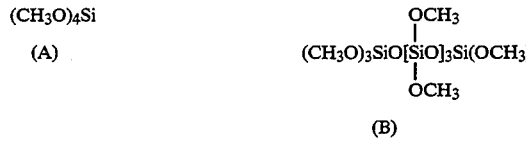

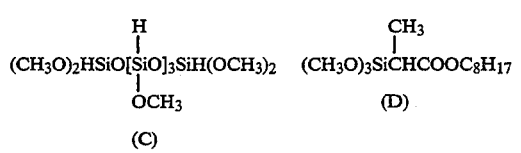

$(CH_3)_2C=C(OC_2H_5)-OSi(OCH_3)_3$ (E)

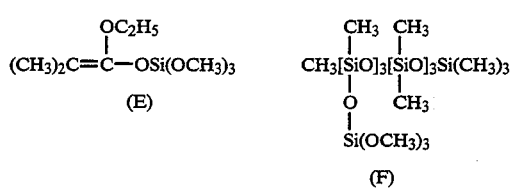

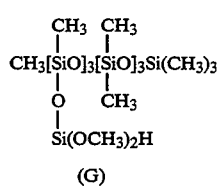

(G)

TABLE 2

| Example | Adhesion to various substrates - Substrate | | | | | | | | | | | |
|---|---|---|---|---|---|---|---|---|---|---|---|
| | PBT | PPS | ABS | PC | PPO | PE | Bak | EP | VCl | Al | Fe | Ni |
| 1 | ○ | ○ | ○ | ○ | ○ | ○ | ○ | ○ | ○ | ○ | ○ | ○ |
| 2 | ○ | ○ | ○ | ○ | ○ | ○ | ○ | ○ | ○ | ○ | ○ | ○ |
| 3 | ○ | ○ | ○ | ○ | ○ | ○ | ○ | ○ | ○ | ○ | ○ | ○ |
| 4 | ○ | ○ | ○ | ○ | ○ | ○ | ○ | ○ | ○ | ○ | ○ | ○ |
| 5 | ○ | ○ | ○ | ○ | ○ | ○ | ○ | ○ | ○ | ○ | ○ | ○ |
| 6 | ○ | ○ | ○ | ○ | ○ | ○ | ○ | ○ | ○ | ○ | ○ | ○ |
| 7 | ○ | ○ | ○ | ○ | ○ | ○ | ○ | ○ | ○ | ○ | ○ | ○ |
| 8 | ○ | ○ | ○ | ○ | ○ | ○ | ○ | ○ | ○ | ○ | ○ | ○ |
| 9 | ○ | ○ | ○ | ○ | ○ | ○ | ○ | ○ | ○ | ○ | ○ | ○ |
| 10 | ○ | ○ | ○ | ○ | ○ | ○ | ○ | ○ | ○ | ○ | ○ | ○ |
| Comparative Example 1 | X | X | X | X | X | X | X | X | X | X | X | X |
| Comparative Example 2 | ○ | X | ○ | X | ○ | ○ | ○ | ○ | ○ | ○ | ○ | ○ |

PBT: polybutylene terephthalate resin,
PPS: polyphenylene sulfide resin,
ABS: acrylonitrile-butadiene-styrene resin,
PC: polycarbonate resin,
PPO: polyphenylene oxide resin,
PE: polyester resin,
Bak: Bakelite resin,
EP: epoxy resin,
VCl: vinyl chloride resins As is evident from Table 2, albeit the organic tin compound, when use alone, is not effective for improving adhesion, the combined use of component (C), adhesion modifier and component (E), organic tin compound provides the synergistic effect that the resulting adhesive composition can firmly adhere to polycarbonate and polyphenylene sulfide resins which are known as difficultly bondable resins.

Although some preferred embodiments have been described, many modifications and variations may be made thereto in the light of the above teachings. It is therefore to be understood that within the scope of the appended claims, the invention may be practiced otherwise than as specifically described.

We claim:
1. A silicone rubber adhesive composition comprising:
   (A) 100 parts by weight of a diorganopolysiloxane containing at least two alkenyl groups in its molecule,
   (B) a diorganohydrogenpolysiloxane having at least two hydrogen atoms directly attached to silicon atoms in its molecule and a viscosity of about 5 to about 5,000 centistokes at 25° C., in an amount such that silicon bonded hydrogen atoms are present at about 0.4 to about 4.0 equivalents per alkenyl group in component (A),
   (C) about 0.1 to about 20 parts by weight per 100 parts by weight of component (A) of a compound containing in its molecule a group represented by (RO)$_3$Si— or H(RO)$_2$Si— wherein R is selected from the group consisting of methyl, ethyl, trifluoroethyl, hexafluoropropyl, and methoxyethyl groups,
   (D) a catalytic amount of a platinum catalyst, and
   (E) about 0.001 to about 1 part by weight per 100 parts by weight of component (A) of a divalent organic tin compound, said composition being cured at a temperature of from about 60° C. to about 120° C. for about 60 to about 180 minutes.

2. The adhesive composition of claim 1 wherein component (C) is selected from the compounds of formulae (I) to (VII):
   (I) (R$^3$O)$_4$Si,
   (II) (R$^3$O)$_3$SiH,
   (III) a partial hydrolysate of the compound of formula (I) or (II),

(IV) (R$^3$O)$_3$SiCHCOOR$^7$ with R$^4$ substituent

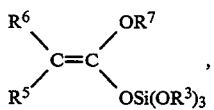

(V)

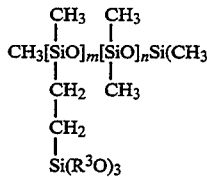

(VI)

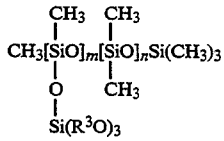

(VII)

wherein R$^3$ is selected from the group consisting of methyl, ethyl, trifluoroethyl, tetrafluoropropyl, and methoxyethyl groups,
R$^4$, R$^5$, and R$^6$ are independently a hydrogen atom or a substituted or unsubstituted monovalent hydrocarbon group having 1 to 8 carbon atoms,
R$^7$ is a substituted or unsubstituted monovalent hydrocarbon group having 1 to 30 carbon atoms, —X, or —Q—X,
Q is a substituted or unsubstituted divalent hydrocarbon group having 1 to 8 carbon atoms,
X is selected from the group consisting of OR$^8$, NR$^9$R$^{10}$, SiR$^8$R$^9$R$^{10}$, and a siloxane polymer having the following formula:

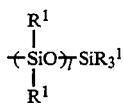

wherein R[1] is a substituted or unsubstituted monovalent hydrocarbon group having 1 to 8 carbon atoms and l is an integer of 0 to 50, R[8], R[9], and R[10] are independently a hydrogen atom or a substituted or unsubstituted monovalent hydrocarbon group having 1 to 8 carbon atoms, and letter m is a number of from 1 to 100 and n is a number of from 0 to 500.

3. The adhesive composition of claim 2, wherein l is an integer of 0 to 6.

4. The adhesive composition of claim 1, wherein component (A) is represented by the Formula (1)

$$R^1_a SiO_{(4-a)/2} \qquad \text{Formula (I)}$$

wherein R[1] represents substituted or unsubstituted monovalent hydrocarbon groups selected from the group consisting of methyl, ethyl, propyl, vinyl, propenyl, butenyl, phenyl, xylyl, and 3,3,3-trifluoropropyl, provided that on average two or more alkenyl groups are contained per molecule, and wherein the letter a is a number in the range of from 1.9 to 2.4.

5. The adhesive composition of claim 1, wherein component (A) is selected from the group consisting of

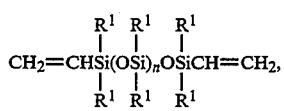

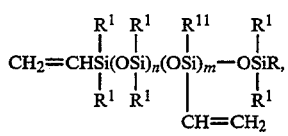

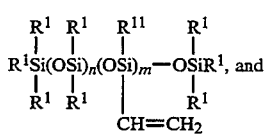

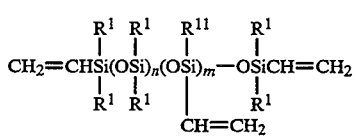

wherein R[1] represents substituted or unsubstituted monovalent hydrocarbon group, selected from the group consisting of methyl, ethyl, propyl, vinyl, propenyl, butenyl, phenyl, xylyl, and 3,3,3-trifluoropropyl, provided that on average two or more alkenyl groups are contained per molecule, and wherein R[11] as defined for R[1] exclusive of an alkenyl group, and m and n are 10 to 2,000.

6. The adhesive composition of claim 1, wherein component (B) is represented by the Formula (2)

$$H_b R^2_c SiO_{(4-b-c)/2} \qquad \text{Formula (2)}$$

wherein R[2] represents substituted or unsubstituted hydrocarbon groups free of an aliphatic unsaturated bond selected from the group consisting of methyl, ethyl, propyl, vinyl, propenyl, butenyl, phenyl, xylyl, and 3,3,3-trifluoropropyl, wherein the letter b is from 0.005 to 1.2, the letter c is from 0.7 to 2.395, and the sum b+c is from 1.9 to 2.4.

7. The adhesive composition of claim 1, wherein the amount of component (B) is such that the silicon bonded hydrogen atoms are present at about from 0.8 to about 2.0 equivalents per alkenyl group in component (A).

8. The adhesive composition of claim 1, wherein component (C) is selected from the group consisting of $(CH_3O)_4Si$, $(CH_3CH_2O)_4Si$, $HSi(OCH_3)_3$, $CH_2=CHSi(OCH_2CH_2OCH_3)_3$,

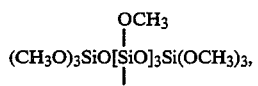

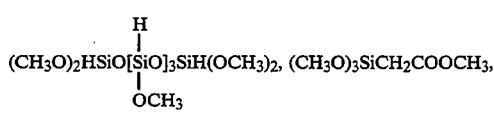

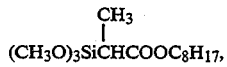

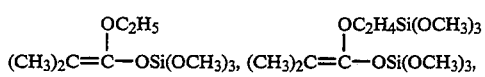

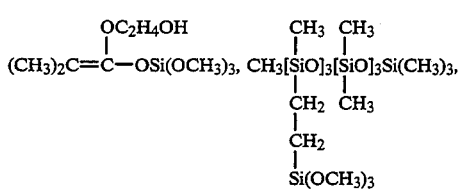

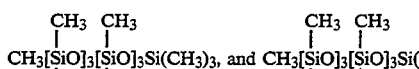

9. The adhesive composition of claim 1, wherein component (C) is present in an amount of 0.1 to 0.5 parts by weight per 100 parts by weight of component (A).

10. The adhesive composition of claim 1, wherein component (D) is present in an amount of from 1 to about 200 parts by weight of platinum per million parts by weight of component (A).

11. The adhesive composition of claim 1, wherein component (E) is tin dioctylate.

12. The adhesive composition of claim 1, wherein component (E) is present in an amount of 0.001 to 0.01 parts by weight per 100 parts by weight of component (A).

13. A silicone rubber adhesive composition comprising:

(A) 100 parts by weight of a diorganopolysiloxane containing at least two alkenyl groups in its molecule, wherein component (A) is represented by the Formula (1)

$$R^1_a SiO_{(4-a)/2} \qquad \text{Formula (1)}$$

wherein $R^1$ represents substituted or unsubstituted monovalent hydrocarbon groups selected from the group consisting of methyl, ethyl, propyl, vinyl, propenyl, butenyl, phenyl, xylyl, and 3,3,3-trifluoropropyl, provided that on average two or more alkenyl groups are contained per molecule, and wherein the letter a is a number in the range of from 1.9 to 2.4;

(B) a diorganohydrogenpolysiloxane having at least two hydrogen atoms directly attached to silicon atoms in its molecule and a viscosity of about 5 to about 5,000 centistokes at 25° C., in an amount such that silicon bonded hydrogen atoms are present at about 0.4 to about 4.0 equivalents per alkenyl group in component (A), wherein the amount of component (B) is such that the silicon bonded hydrogen atoms are present at about from 0.8 to about 2.0 equivalents per alkenyl group in component (A);

(C) about 0.1 to about 20 parts by weight per 100 parts by weight of component (A) of a compound containing in its molecule a group represented by $(RO)_3Si-$ or $H(RO)_2Si-$ wherein R is selected from the group consisting of methyl, ethyl, trifluoroethyl, hexafluoropropyl, and methoxyethyl groups, wherein component (C) is selected from the compounds of formulae (I) to (VII):

(I) $(R^3O)_4Si$, (II) $(R^3O)_3SiH$, (III) a partial hydrolysate of the compound of formula (I) or (II),

(IV)

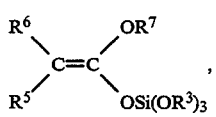

(V)

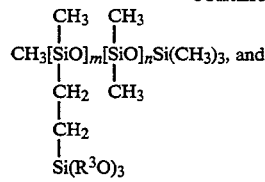

(VI)

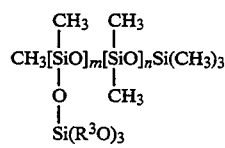

(VII)

wherein $R^3$ is selected from the group consisting of methyl, ethyl, trifluoroethyl, tetrafluoropropyl, and methosyethyl groups, $R^4$, $R^5$, and $R^6$ are independently a hydrogen atom or a substituted or unsubstituted monovalent hydrocarbon group having 1 to 8 carbon atoms, $R^7$ is a substituted or unsubstituted monovalent hydrocarbon group having 1 to 30 carbon atoms, —X, or —Q—X, Q is a substituted or unsubstituted divalent hydrocarbon group having 1 to 8 atoms, X is selected from the group consisting of $OR^8$, $NR^9R^{10}$, $SiR^8R^9R^{10}$, and a siloxane polymer having the following formula:

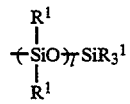

wherein $R^1$ is a substituted or unsubstituted monovalent hydrocarbon group having 1 to 8 carbon atoms and l is an integer of 0 to 50, $R^8$, $R^9$, and $R^{10}$ are independently a hydrogen atom or a substituted or unsubstituted mono-valent hydrocarbon group having 1 to 8 carbon atoms, and letter m is a number of from 1 to 100 and n is a number of from 0 to 500;

(D) a catalytic amount of a platinum catalyst, wherein component (D) is present in an amount of from 1 to about 200 parts by weight of platinum per million parts by weight of component (A); and (E) about 0.001 to about 1 part by weight per 100 parts by weight of component (A) of a divalent organic tin compound, said composition being cured at a temperature of from about 60° C. to about 120° C. for about 60 to about 180 minutes.

14. The adhesive composition of claim 13, wherein the integer l is 0 to 6.